UNITED STATES PATENT OFFICE.

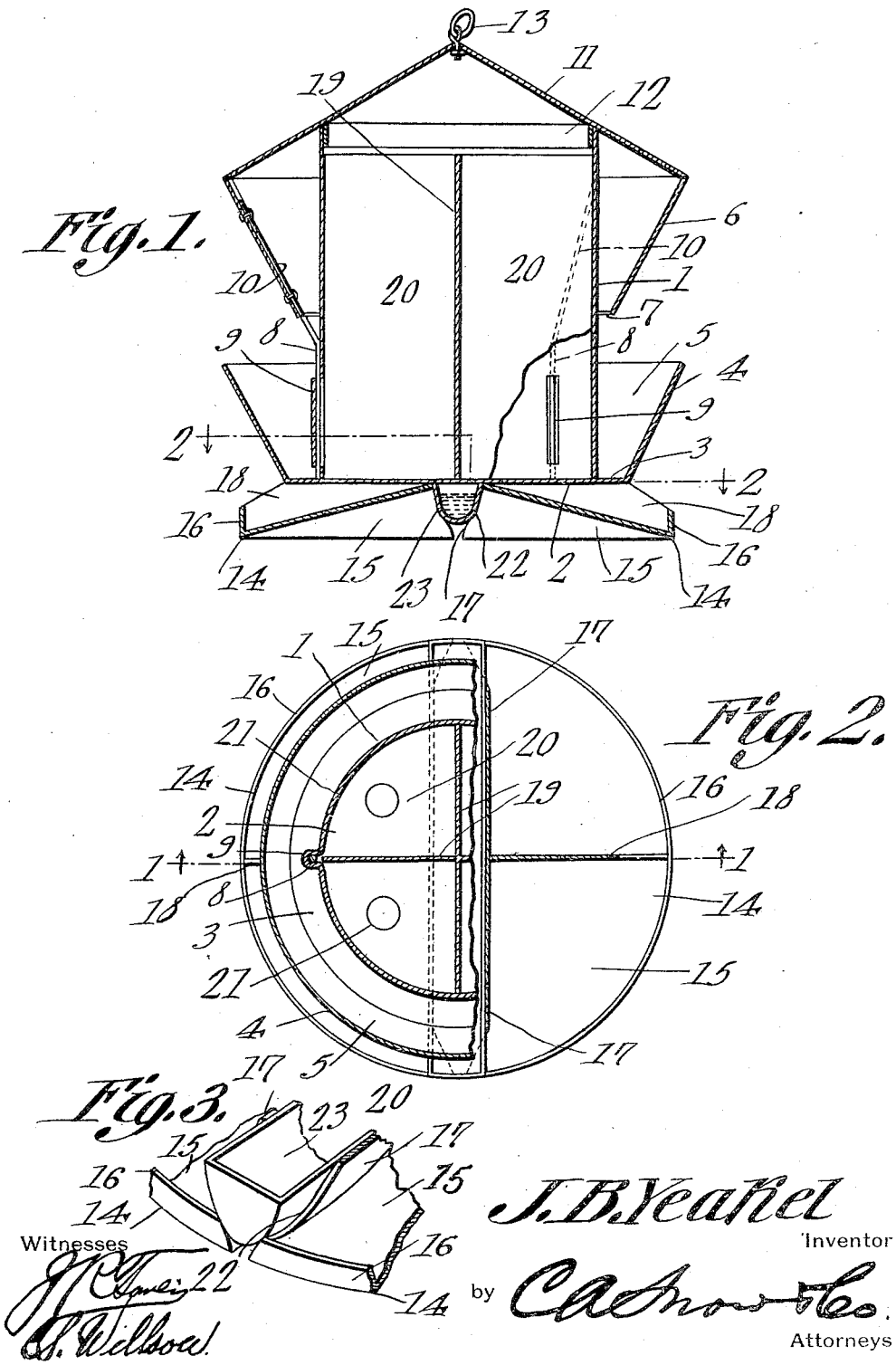

JOHN B. YEAKEL, OF CENTER VALLEY, PENNSYLVANIA.

CHICKEN-FEEDER.

1,127,572.  Specification of Letters Patent.  Patented Feb. 9, 1915.

Application filed March 17, 1914. Serial No. 825,400.

*To all whom it may concern:*

Be it known that I, JOHN B. YEAKEL, a citizen of the United States, residing at Center Valley, in the county of Lehigh and State of Pennsylvania, have invented a new and useful Chicken-Feeder, of which the following is a specification.

The present invention appertains to a feeding device for chickens or other farm stock, and aims to provide a novel and improved contrivance of that character.

It is the object of the present invention to provide a feeder which will be adapted to hold several different kinds of feed, and which is provided with novel means for delivering the various sorts of feed to the exterior, where the same may be readily partaken of by the chickens or other stock.

The present invention, as a more specific object, aims to provide a feeder embodying novel means for receiving wet or dry mash feed, and for discharging the same so as to be accessible by the stock.

Another object of the present invention is to provide a casing or container embodying a plurality of bins or chambers therein, in combination with troughs mounted or arranged below the casing and communicating with the bins or chambers to receive the feed from the bins and for delivering it to the exterior in a desirable manner.

A still further object of the present invention is to provide a feeder having a watering trough or receptacle combined therewith in a unique manner.

The invention also contemplates the provision of a novel closure for the feed bins or containers.

The present invention also contemplates the provision of a feeder of the nature indicated, which will be comparatively simple, compact and inexpensive in construction, and which will be simple, convenient, practical and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawings, wherein:—

Figure 1 is a central vertical section of the feeder, taken on the line 1—1 of Fig. 2, parts being broken away. Fig. 2 is a horizontal section of the device, taken on the line 2—2 of Fig. 1. Fig. 3 is a fragmental perspective view of one end portion of the water trough, and the adjacent portions of the lowermost feed troughs or chutes.

In carrying out the present invention, there is provided a casing or hollow body 1, which is preferably cylindrical, and the bottom 2 of which is provided with an outstanding annular flange 3 provided with an upturned annular flared or inclined rim 4 forming an annular feed trough 5. The feed trough 5 surrounds the lower portion of the casing or body 1, and is adapted to receive the mash feed, as will hereinafter more fully appear.

Surrounding the casing 1, at a point slightly below its upper end, is an annular frusto-conical or funnel-shaped shell 6, which tapers downwardly, and the lower edge of which is disposed adjacent, but spaced slightly from, the side walls of the casing 1, to provide an annular slot or opening 7 above the trough 5. The upper edge of the shell 6, is disposed below the plane of the upper end of the casing 1, the shell 6 providing a hopper for the mash feed.

The shell or hopper 6 is supported by a plurality of upright rods or supporting members 8 having their lower end portions inserted through vertical outstruck portions 9 of the casing 1 adjacent the trough 5, the upper end portions of the rods or supporting members 8 being bent angularly away from the casing 1, so as to be inclined, and so as to fit the interior of the shell or hopper 6, as at 10. The upper angular portions 10 of the supporting members 8 are preferably riveted on the interior of the shell 6, although they may be secured thereto in any suitable manner. It is evident that the rods or supporting members 8 will support the shell or hopper 6 above the trough 5 in an effective manner, and will not seriously interfere with the passage of the feed through the slot or opening 7.

A conical lid or cover 11 is provided for the upper ends of the casing 1 and hopper 6, the rim or periphery of the lid or closure 11 being adapted to rest upon the rim or upper edge of the hopper 6, and the lid 11 being provided with an inner depending flange or collar 12 insertible into the mouth of the casing 1, whereby the mouths of the casing and hopper may be closed simultaneously by the lid or cover. The lid 11 is preferably provided at its apex with a ring or any other suitable handhold 13 for convenience in removing and applying the lid.

Arranged below the bottom of the casing 1 and trough 5, is a pair of opposed approximately semi-circular troughs or chutes 14, each of which embodies a somewhat semi-conical bottom or chute portion 15, having an upturned rim or flange 16 along its curved edge, and tapered walls 17 along its straight edges. A tapered partition 18 is also secured upon the bottom 15 intermediate, and at right angles to, the walls 17, to divide the trough or chute into two parts or sections. The upper edges of the walls 17 and partitions 18 of the troughs 14 are soldered or otherwise secured to the bottom of the casing 1 and trough 5, and the rim or peripheral portions of the troughs 14 protrude or project beyond the bottom of the trough 5, so as to permit the four sectoral-shaped trough sections to be readily accessible from the sides of the trough 5.

Arranged within the casing or body 1, are partitions 19, which divide the casing into four bins or cells 20, the bottom 2 of the casing being provided with an outlet opening or aperture 21 for each of the bins or cells, leading to one of the sections of the feed troughs or chutes 14.

The adjacent sides or walls 17 of the troughs or chutes 14 are spaced apart, and are parallel, the said sides or walls 17 also being inclined and curved slightly, so as to converge downwardly, to provide a slideway 22 therebetween for receiving a water trough 23. Thus, the water trough 23, which is preferably concaved transversely, may be slid endwise within the slideway 22 formed between the walls of the troughs 14, to support the water trough from the feed troughs 14 in an effective and desirable manner, with the ends of the trough 23 accessible.

The troughs 14 serve as the base or foundation for the casing or body 1 and the feed trough 5, although it is to be understood that the device may be supported on any suitable legs or their equivalents. It will be evident that the several parts, with the exception of the rods or supporting members 8, and the ring or handle 13, may be readily manufactured from suitable sheet metal in an inexpensive and desirable manner.

In use, the feeder may be set upon the ground, or may be placed upon any suitable feeding surface, the marginal portions of the troughs 14 being adapted to rest upon the ground, to support the feeder in a substantial and desirable manner. When the cover or lid 11 is removed, the bins or cells 20 and the hopper 6 will be opened, whereby wet or dry mash feed may be placed within the hopper 6, and whereby various grains or other kinds of feed may be placed in the several bins or cells 20. Then, when the cover 11 is applied, the same will close the hopper and bins, in a convenient and desirable manner, and will serve to shed water over the sides of the feeder, the formation of the cover also preventing the chickens from perching thereon. The mash feed within the hopper 6 will gravitate or drop through the annular opening or slot 7 into the trough 5, from whence it may be eaten or removed by the chickens in a convenient manner, there being an annular opening or space between the hopper 6 and the rim of the trough 5. The grains or various feeds within the bins or cells 20 will run down through the openings 21 and fill the bottoms 15 of the lower troughs 14, adjacent the rims 16, so as to be readily accessible from the sides of the trough 5. The troughs 14 open upwardly at the sides of the trough 5, and will permit the chickens to partake of the various sorts of feed from the several divisions of the troughs or chutes 14. As the feed is removed from the troughs 14, fresh supplies of feed will trickle or run down through the openings 21 to continually fill the divisions or sections of the troughs 14, it being noted that the several bins 20 are isolated from each other, as well as the sections or divisions of the troughs 14. This will keep the grains or feed separated in a desirable manner.

The water trough 23 may be readily slid longitudinally or endwise so as to be filled, and when slid to normal position, as seen in Fig. 2, the ends of the water trough will be accessible between troughs 14 and at the sides of the trough 5. The manner of supporting the water trough 23 from the troughs 14 provides a compact and desirable arrangement, it also being noted that the end portions of the trough will be shaded more or less from the sun, to reduce the evaporation of the water to a minimum. The trough 23 being concaved transversely, will prevent the trough from being burst open, due to the freezing of the water, as will be evident.

Having thus described the invention, what is claimed as new is:—

1. A feeding device comprising a casing, an annular trough surrounding the casing, an annular shell surrounding the casing above the trough, and providing a hopper, the lower edge of the said shell being spaced from the casing to provide an annular slot, means for supporting the said shell, and a cover seatable on the upper edge of the said shell and having means for closing the upper end of the casing.

2. A feeding device embodying a casing, opposite troughs arranged below and attached to the bottom thereof, the troughs having a slideway therebetween, the bottom of the casing having openings leading to the troughs, and a trough slidably disposed within the said slideway and having its ends protruding from the casing.

3. A feeding device comprising a casing, opposite troughs arranged below and attached to the bottom thereof, the adjacent sides of the said troughs being inclined to provide a slideway therebetween, the bottom of the casing having openings leading to the said troughs, and a trough slidably arranged within the said slideway, and having its ends protruding.

4. A feeding device comprising a cylindrical casing, a pair of semi-circular troughs arranged below and attached to the bottom of the casing, the adjacent sides of the troughs being spaced apart and having a slideway therebetween, the bottom of the casing having openings leading to the troughs, and a trough slidably arranged within the slideway and having its ends protruding.

5. A feeding device comprising a cylindrical casing, a pair of semi-circular troughs arranged below the casing, each of the said troughs embodying a semi-conical bottom having an upturned rim along its curved edge, and walls along its other edges attached to the bottom of the casing, the said walls of the troughs being spaced apart and being inclined to provide a slideway therebetween, and a trough slidably arranged in the said slideway and having its ends protruding, the bottom of the casing having openings leading to the first mentioned troughs.

In testimony that I claim the foregoing as my own, I have hereto affixed my signature in the presence of two witnesses.

JOHN B. YEAKEL.

Witnesses:
REBECCA BIEHN,
CHARLES F. BIEHN.

Copies of this patent may be obtained for five cents each, by addressing the "Commissioner of Patents, Washington, D. C."